(No Model.)
C. PORTER.
OIL FILTER.
No. 459,099. Patented Sept. 8, 1891.
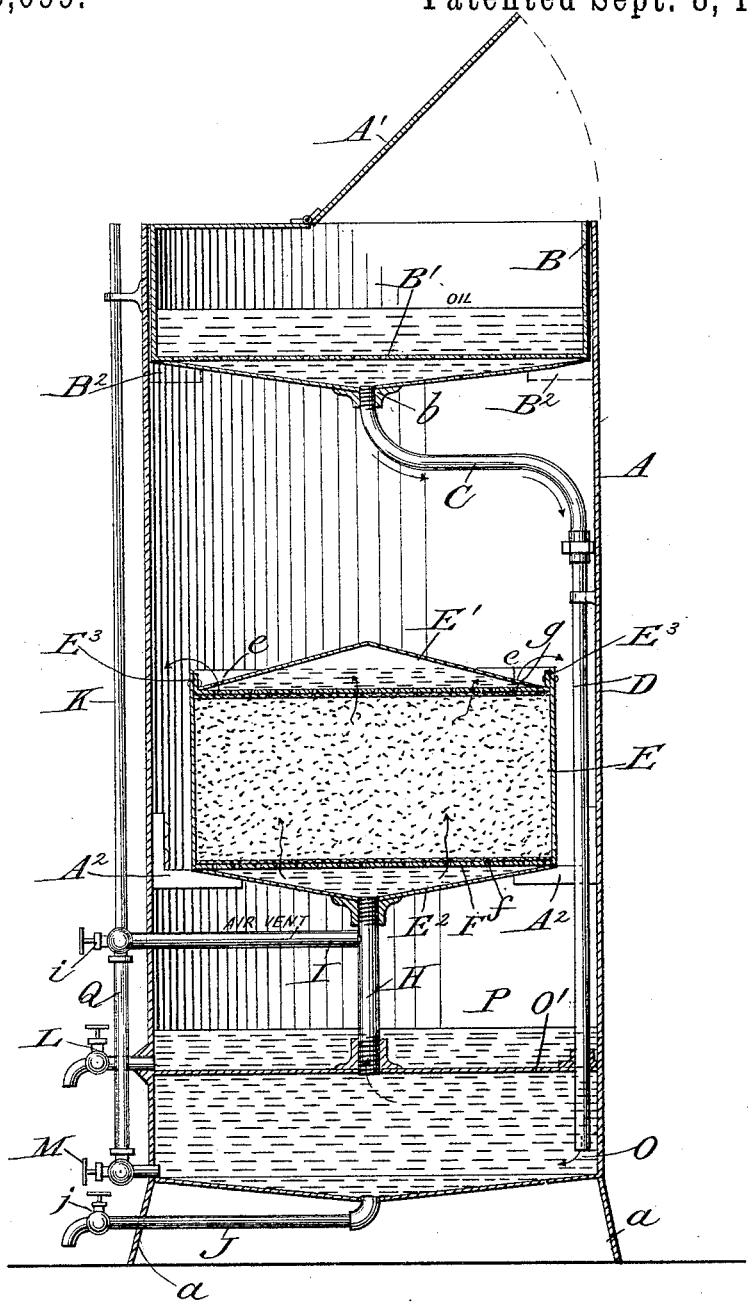
Attest:
H. H. Schott
Wm L. Boyden
Inventor
Charles Porter
per John C. Tasker,
Atty.
THE NORRIS PETERS CO., PHOTO-LITHO., WASHINGTON, D. C.

UNITED STATES PATENT OFFICE.

CHARLES PORTER, OF DOVER, NEW HAMPSHIRE.

OIL-FILTER.

SPECIFICATION forming part of Letters Patent No. 459,099, dated September 8, 1891.

Application filed March 25, 1891. Serial No. 386,342. (No model.)

*To all whom it may concern:*

Be it known that I, CHARLES PORTER, a citizen of the United States, residing at Dover, in the county of Strafford and State of New Hampshire, have invented certain new and useful Improvements in Oil-Filters; and I do hereby declare the following to be a full, clear, and exact description of the invention, such as will enable others skilled in the art to which it appertains to make and use the same.

This invention relates to an improvement in oil-filters, the object of the invention being to provide a simple, cheap, and efficient device for filtering oil or other similar substances; and the invention consists, essentially, in the construction, arrangement, and combination of the several parts, substantially as will be hereinafter described and claimed.

In the annexed drawing I have represented a vertical section of my improved oil-filter, certain of the pipes belonging thereto being shown in elevation.

A designates a cylindrical or other suitably-shaped receptacle of any convenient size and form, it being preferably mounted on the bottom flange or foot-piece $a$. In the upper end of the cylindrical receptacle A is located a removable top chamber B, of suitable size and shape to permit it to fit neatly into the upper end of receptacle A. This chamber B is provided with a hinged cover A', adapted to be opened or closed. Into the chamber B the oil which it is desired to filter is first poured. The chamber B is provided, preferably, with a conical-shaped bottom of a shallow form, and with a horizontal strainer-plate B', suitably perforated, said strainer serving to collect the larger particles and impurities and prevent them from passing downward with the oil as it courses out through the lower end of the chamber B and finds its way to the other parts of the filter. The chamber B may be supported in part, if desired, by means of projections or brackets $B^2$, fixed on the inside face of the receptacle A and shown in the drawing in dotted lines. A pipe C is coupled centrally to the bottom of the top chamber B, the coupling being effected by a suitable union $b$, made rigid with the bottom of the chamber. The coupling of the chamber with the pipe C is effected by rotating the chamber and thus securing the pipe thereto. Obviously by turning the chamber in an opposite direction it can be disconnected from pipe C, and may at any time be lifted out from the receptacle A when thus disconnected. Pipe C is preferably compoundly curved to a point near the wall of the receptacle A, where it is united by a union or coupling with a vertical pipe D, which extends downward inside of the receptacle A to a point near the bottom of the said receptacle, where it enters a chamber O, which I term the "settling-chamber."

O' designates a horizontal partition which is secured within the main cylindrical receptacle A at a point a short distance above the bottom thereof. The oil, after passing out of the top chamber B, enters pipe C, and thence flows into pipe D and downward through said pipe, finding an outlet at the lower end of the pipe into the settling-chamber O. A pipe J is connected centrally to the bottom of the chamber O, and this pipe is provided with a cock $j$. If there is any water mingled with the oil which enters the settling-chamber, this water will settle at the bottom thereof, and can be drawn off by means of the cock or faucet $j$. The oil within the settling-chamber O passes upward in the direction of the arrow into a central vertical pipe H, which emerges from the settling-chamber at the central point of the partition O'. The pipe H runs to the filter E, which consists of a cylindrical or other suitably-shaped receptacle having a conical bottom $E^2$, which is entered centrally by pipe H, and having also a conical top E'.

Within the filtering-chamber E are two horizontal strainer-plates, one F located near the bottom and the other G located near the top. The sides of the perforated strainers F and G, which are opposite each other, are preferably covered with sheets of thin finely-meshed or finely-perforated fabric or material, so that the filtering process may be more complete, said finely-meshed fabric being designated by the reference-letters $f$ and $g$, respectively. The space within the filtering-chamber E between the two horizontal strainer-plates is filled with sawdust. This is the preferable material employed for the purpose, and I deem it the best substance through which to filter oil. Other substances might possibly be employed, and I reserve the liberty of adopting them in place of the sawdust, if desired. The upper edge of the cylindrical filter-chamber E is provided with an encircling flange E³, and the cover E' has its periphery set below the edge of flange E³—say an inch or more—and said cover E' is bolted or otherwise securely fastened, so that it may be firmly held down in its place, as there is considerable pressure against it. This cover E' is provided with a suitable number of perforations e, through which the oil can pass. The oil passing through the pipe H enters the lower end of the filtering-chamber and occupies the conical space therein below the bottom strainer-plate. By means of this conical bottom E², therefore, the oil is permitted to fill the whole bottom end of the filter before it begins to pass upward through the filtering material. After this conical space has been filled the oil will pass upward through the filtering material in the direction shown by the arrows, and will then find an escape from said material into the conical upper end of the filtering-chamber and will then be passed through the perforations e. The oil thus filtered falls down over the top of the filtering-chamber into the storage-chamber P, which is provided within the interior of the cylindrical receptacle A and below and around the filtering-chamber E, which is located centrally within said receptacle A. Clean oil can therefore be drawn off at any time by means of the cock or faucet L, which is fixed in a short pipe that enters the storage-chamber P at a suitable point just above the bottom of said chamber, which is formed by the horizontal partition O'. The filtering-chamber E may be supported, if desired, by means of brackets A², secured to the inside of the wall of the chamber A, the ends of said brackets projecting beneath the lower edges of the chamber E. The filtering-chamber E may be supported in any other manner, if desired.

K designates an air-vent pipe located vertically along the outside of the main receptacle A and running to the top of the same, as shown. The lower end of the pipe K connects with the upper end of a vertical gage-glass Q.

I denotes a pipe running from the vertical oil-pipe H to the upper end of the gage-glass Q, where it is connected to the air-pipe K. A suitable fitting or coupling connects together the upper end of the glass Q, lower end of pipe K, and outer end of air-pipe I, said fitting being provided with a cock or valve i. The lower end of the gage-glass Q is provided with another suitable fitting having a cock M and having a short branch pipe that enters the wall of the settling-chamber O near the bottom thereof. The gage-glass having the bottom connection with the settling-chamber O, permits, therefore, all the air to pass out from the settling-chamber when the oil is being poured thereinto. It also shows the state of things in the settling-chamber. The pipe K, running to the top of the main receptacle, is considered by me to be an exceedingly important and valuable feature of the invention, inasmuch as it allows an air-vent, not only permitting the air to escape from the settling-chamber, but also permitting air to escape from the other passages and allowing the oil to course its way freely and undisturbed through the different connections.

It is a well-known fact that there is more or less water in drip-oil, especially those oils that come from steam-engines. When the water gets above a certain point in the chamber O, it can be drawn off through the faucet j, and also all other settling and other foreign matter and various impurities which may collect in the settling-chamber can always be withdrawn. Sawdust is deemed by me to be a valuable material for use in filtering, since it can be packed as closely and tightly as may be desirable. The filtering-chamber E is readily removable. Its bottom E² is provided with a central union which screws tightly upon the upper end of the pipe H. Therefore it will be seen that all the parts of my improved filter can readily be disconnected from each other or connected together at any time, and the result is that the filter may be thoroughly and effectually cleaned with but little trouble, and all its parts can be readily rearranged or changed and manipulated as may be thought fit or necessary at any time.

In order to clean the device, all that it is necessary to do is to remove the top chamber B by unscrewing it from the top chamber recesses, then remove the bent pipe C by disconnecting it from pipe D, then take out the filtering-chamber by disconnecting it from pipe H, then remove the filtering material, replace it with new material and clean the several parts of the filter, as may be desired, after which they can all be readily restored to their normal conditions and the filter be in complete effective shape again in a very short time. I also urge that by the use of a filtering material such as sawdust I can filter oil much better and more completely than can be done by the use of water.

I am aware that it is common to employ water for filtering purposes, but I am of the opinion that such filtering is not effective in any way. By my improved filter, however, I believe that oil can be thoroughly and completely cleansed from all of its impurities as well as other substances. In practical use the filter works with great success.

Having thus described my invention, what I claim as new, and desire to secure by Letters Patent, is—

1. In a filter, the combination of the main receptacle A, having at its base a settling-chamber O, provided with a draw-cock j, a removable top chamber B, having a cover A' and a perforated partition B', pipes C D, connecting chamber B with settling-chamber O, filtering-chamber E, filled with sawdust, pipe H, connecting filtering-chamber E with settling-chamber O, and vent-pipe K, communicating with pipe H and also with the settling-chamber, substantially as described.

2. The combination of the receptacle A, top chamber B, having perforated strainer B', the pipe C, connected to chamber B, pipe D, connected to pipe C, settling-chamber O, having a draw-off cock and entered by pipe D, the filtering-chamber E, having a strainer at top and bottom and filled with sawdust, a pipe H, connecting the filtering-chamber with the settling-chamber, and an air-vent pipe K, substantially as described.

3. The combination, in a filter, of the settling-chamber O, having a draw-off cock, the upper chamber B, having a strainer, pipes C D, connecting chamber B with settling-chamber O, filtering-chamber E, filled with sawdust and provided with a strainer at top and bottom, said top and bottom of the filtering-chamber being formed conical and the top being provided with suitable perforations, pipe H between the filtering-chamber and the settling-chamber, a gage-glass Q, the lower end of which communicates with the settling-chamber, a pipe I, running from pipe H to the top of the gage-glass, and a pipe K, running to the top of the main receptacle and connected to the gage-glass, together with a cock L for the clean oil, substantially as described.

In testimony whereof I affix my signature in presence of two witnesses.

CHARLES PORTER.

Witnesses:
C. R. WHITTEMORE,
A. G. WHITTEMORE.